(12) United States Patent
Platner et al.

(10) Patent No.: US 6,233,510 B1
(45) Date of Patent: May 15, 2001

(54) METHOD AND SYSTEM FOR PREDICTING ROAD PROFILE

(75) Inventors: David K. Platner, Shelby; Kurt A. Burmeister, Rochester Hills, both of MI (US); Thomas Hughes, Near Crewe (GB); Ragnar H. Ledesma, Sterling Heights, MI (US); Steven R. Miller, Clarkston, MI (US); Mark P. Reynolds, Birmingham, MI (US); Monte G. Williams, Royal Oak, MI (US)

(73) Assignee: Meritor Heavy Vehicle Technology, LLC

( * ) Notice: Subject to any disclaimer, the term of this patent is extended or adjusted under 35 U.S.C. 154(b) by 0 days.

(21) Appl. No.: 09/419,484

(22) Filed: Oct. 15, 1999

(51) Int. Cl.$^7$ .................................................. B60G 17/015
(52) U.S. Cl. .............................. 701/37; 382/104; 382/108
(58) Field of Search ........................ 701/37, 80; 348/118; 382/104, 108; 342/73, 70–72

(56) References Cited

U.S. PATENT DOCUMENTS

| | | | |
|---|---|---|---|
| 4,781,465 | * | 11/1988 | Demachi et al. ..................... 356/371 |
| 5,061,932 | * | 10/1991 | Tribe et al. ............................. 342/70 |
| 5,163,319 | * | 11/1992 | Spies et al. ............................. 73/146 |
| 5,322,319 | * | 6/1994 | Tanaka et al. ..................... 280/5.503 |
| 5,432,700 | * | 7/1995 | Hrovat et al. .......................... 701/37 |
| 5,450,322 | * | 9/1995 | Tanaka et al. ........................... 701/37 |
| 5,706,355 | * | 1/1998 | Raboisson et al. .................. 382/104 |
| 5,832,398 | * | 11/1998 | Sasaki et al. ........................... 701/37 |
| 5,848,663 | | 12/1998 | Kuriki . |
| 6,028,948 | * | 2/2000 | Kil et al. .............................. 382/108 |
| 6,031,928 | * | 2/2000 | Scott ..................................... 382/108 |

FOREIGN PATENT DOCUMENTS

| | | | |
|---|---|---|---|
| 0412719A1 | * | 2/1991 | (EP) . |
| 0412719 | | 2/1991 | (EP) . |
| 1210712 | | 10/1970 | (GB) . |
| 2151872 | | 7/1985 | (GB) . |
| 2270050 | | 3/1994 | (GB) . |
| 2266910 | | 11/1994 | (GB) . |
| 3-078608 | | 3/1991 | (JP) . |
| 3-182825 | * | 8/1991 | (JP) . |
| 6-344750 | * | 12/1994 | (JP) . |

OTHER PUBLICATIONS

Laurent et al., "Road surface inspection using laser scanners adapted for high precision 3D measurements of large flat surfaces", May 1997, pp.303–310, ISBN: 0–8186–7943–3.*

\* cited by examiner

*Primary Examiner*—Michael J. Zanelli
*Assistant Examiner*—Eric M Gibson
(74) *Attorney, Agent, or Firm*—Carlson, Gaskey & Olds

(57) ABSTRACT

A method and system for predicting the condition of a road to be travelled by a vehicle includes a measurement device, such as a laser or machine vision system, disposed at a front of the vehicle for measuring a vertical elevation of a portion of the road at a predetermined distance ahead of the vehicle. A control unit, in communication with the measurement device, has control logic for predicting the condition of the road to be travelled by the vehicle based on the measured vertical elevation and controlling an aspect of the vehicle, such as the vehicle's suspension system, based on the predicted road condition.

12 Claims, 1 Drawing Sheet

METHOD AND SYSTEM FOR PREDICTING ROAD PROFILE

BACKGROUND OF THE INVENTION

The invention relates to methods and systems for predicting road profile for use in vehicle control, such as anti-lock braking systems and suspension systems.

Methods and devices exist today to assist the driver of a vehicle in many ways. For example, anti-lock braking systems aid the driver in stopping the vehicle in a controlled manner when braking on an unstable surface, such as wet or icy pavement. These systems monitor the wheel speed as the vehicle stops to determine if there is any wheel slippage and then controls the pressure applied to the brakes accordingly.

As another example, suspension systems assist the driver in driving smoothly over different pavement terrains. That is, suspension systems stiffen when traveling over smooth roads to minimize bouncing, yet soften when traveling over rough roads to achieve the same affect.

However, a drawback to these and other systems available on automotive vehicles, is that they respond to the road surface after the fact. That is, the systems respond initially in a pre-programmed manner until the road conditions are determined. After that, each of the systems can respond in an efficient manner according to the road condition being traveled.

SUMMARY OF THE INVENTION

A method and system for predicting the condition of a road to be travelled by a vehicle is provided. A measurement device disposed at a front of the vehicle measures a vertical elevation of a portion of the road at a predetermined distance ahead of the vehicle. A control unit is in communication with the measurement device and has control logic for predicting the condition of the road to be travelled by the vehicle based on the measured vertical elevation. The control unit is further operative to control the vehicle based on the predicted road condition.

The measurement device may be a laser device wherein, in measuring the vertical elevation of the road, transmits a signal ahead of the vehicle at a known first time, receives the signal at the vehicle at a second time, and determines a difference between the first time and the second time. A triangulation technique is then performed on the difference to determine surface rouginess of the road to be travelled by the vehicle.

Alternatively, the measurement device may be a machine vision system wherein the machine vision system receives an image of the portion of the road having varying characteristics based on the roughness of the road. The varying characteristics may be varying shades of color or varying grey-scale images.

The control unit utilizes the predicted road condition to control a suspension system that has a computer-controlled component for varying the response of the suspension system. Furthermore, a position sensor may be mounted on the front axle of the vehicle and which is in communication with the control unit for sensing a level of activity of the front axle. The control unit then controls the rear axle based on the predicted condition of the road and the activity level of the front axle.

These and other features of the present invention can be understood from the following specification and drawings.

DETAILED DESCRIPTION OF A PREFERRED EMBODIMENT

Figure 1:
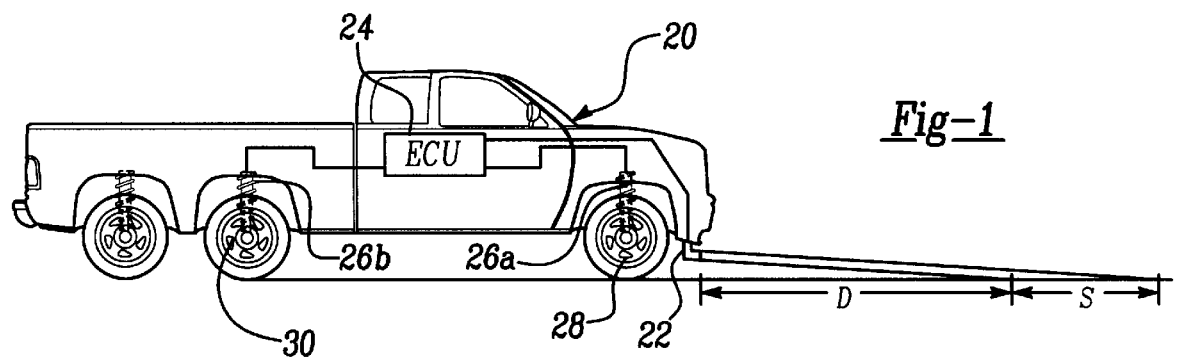
FIG. 1 is a schematic block diagram of a vehicle incorporating the method and system of the present invention.

FIG. 1 shows a vehicle 20 incorporating the present invention. A measurement device 22 is mounted on the front of the vehicle 20 and measures a vertical elevation of a portion of the road, S, at a predetermined distance, D, ahead of the vehicle. The measurement device 22 may be a machine vision system, or camcorder, that draws implications from images read by the vision system. A smooth picture void of strong color or grey-scale changes implies a smooth surface. An image with a high degree of shade changes, such as may be due to pot holes or surface irregularities, implies a rough surface. Preferably, the machine vision system is accurate to a specific resolution, e.g., +/−5 mm, and have adequate bandwidth, e.g., up to 50 Hz.

Alternatively, the measurement device 22 may be a laser that utilizes reflected data to quantify the road surface. A signal is transmitted at a first known time, and then reflected off the road surface and received by the laser at a second time. A triangulation technique is then performed on the difference between the first and second times to determine the height of the portion of the road surface being measured. More than one laser can be utilized and, in this case, the reflected signals are integrated to determine the change in height of the road surface.

The data obtained from measurement device 22 is transmitted to an Electronic Control Unit (ECU) 24 having control logic programmed therein. Based on the data, the control logic in the ECU 24 determines the condition of the road ahead to be travelled by the vehicle by quantifying the road surface in varying degrees from smooth to rough.

This information is used in controlling various aspects of the vehicle, such as the vehicle's suspension system, illustrated generally at 26a, 26b and mounted on a front axle 28 and a rear axle 30, respectively, of the vehicle 20. The suspension system 26a, 26b may be any typical suspension system having a computer-controlled variable component, such as spring rate, damping rate, flow rate, pressure, reservoir volume, height, etc. Thus, the computer-controlled variable component is controlled/adjusted in a conventional manner to insure a smoother ride and minimize tire load variations prior to actually traversing the road based on the predicted condition of the road ahead of the vehicle.

Figure 2:
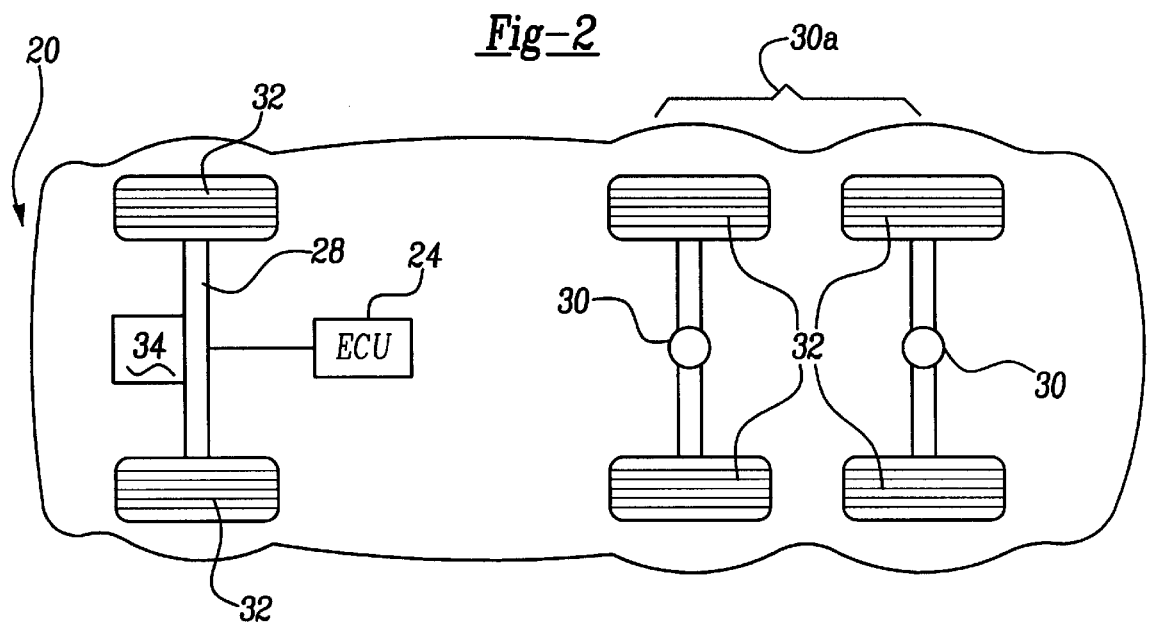
FIG. 2 is a schematic view of the vehicle shown in FIG. 1 incorporating the present invention.

Control of the suspension system can be further enhanced by controlling the rear axle 30 of the vehicle 20 based on information from of the front axle 28 as well as the predicted condition of the road. The vehicle 20 typically includes a front non-drive steering axle 28 and a rear axle 30, as illustrated in FIG. 2. Alternatively, the rear axle may be a tandem axle as illustrated at 30a. The axles 28,30 support the vehicle 20 on the road via wheels 32. In an alternative embodiment of the present invention, a front-axle motion sensor 34 is mounted on the front axle 28 and is in communication with ECU 24. ECU 24 receives a signal from motion sensor 34 indicating the level of activity of the front axle. This motion data is also indicative of road condition. This signal, as well as the predicted road condition, is used by ECU 24 to control the rear axle 30 and, in particular, the suspension system for the rear axle.

Preferred embodiments have been disclosed. However, a worker skilled in this art would recognize that modifications would come within the scope of this invention. Thus, the following claims should be studied to determine the scope and content of this invention.

What is claimed is:

1. A method for predicting the condition of a road to be traveled by a vehicle, the method comprising:

determining a condition of a portion of the road at a predetermined distance ahead of the vehicle;

predicting the condition of the road to be traveled by the vehicle based on the determined condition;

controlling the vehicle based on the predicted road condition;

said vehicle having a suspension system with a computer-controlled component associated with a rear axle for varying a stiffness of the suspension system; and wherein controlling the vehicle includes the step of controlling the computer-controlled component associated with said rear axle by sensing a motion of a front axle to determine a level of activity of said front axle and controlling the computer controlled component based on said predicted condition of the road and a level of activity of said front axle.

2. The method as recited in claim 1 wherein the determined condition is the vertical elevation of the road which is determined by the steps of:

transmitting a signal ahead of the vehicle at a known first time;

receiving the signal at the vehicle at a second time; and determining a difference between the first time and the second time.

3. The method as recited in claim 2 wherein determining the difference includes performing a triangulation technique on the difference to determine surface roughness of the road to be travelled by the vehicle.

4. The method as recited in claim 1 wherein determining the condition of the road comprises:

receiving an image of the portion of the road, the image having varying characteristics based on the roughness of the road.

5. The method as recited in claim 4 wherein the varying characteristics include varying shades of color.

6. A system for predicting the condition of a road to be traveled by a vehicle, the system comprising:

a measurement device disposed at a front of the vehicle for determining a condition of a portion of the road at a predetermined distance ahead of the vehicle;

a control unit in communication with the measurement device having control logic for predicting the condition of the road to be traveled by the vehicle based on the determined condition and controlling the vehicle based on the predicted road condition, said vehicle having a suspension system with a computer-controlled component for varying the stiffness of said suspension system and wherein said control unit in controlling the vehicle is operative to control said computer-controlled component, said computer-controlled component being associated with a rear axle of the vehicle, said vehicle further including a front axle, and wherein a motion sensor is mounted on said front axle and is in communication with said control unit for sensing a level of activity of said front axle, said control unit being operative to control said computer-controlled component associated with said at least one rear axle based on a predicted condition of the road and the level of activity of said front axle.

7. The system as recited in claim 6 wherein the measurement device measures the vertical elevation of the road and is further operative to transmit a signal ahead of the vehicle at a known first time and receive the signal at the vehicle at a second time and wherein the control logic, in predicting the condition of the road, is further operative to determine a difference between the first time and the second time.

8. The system as recited in claim 7 wherein the measurement device, in determining the difference, is further operative to perform a triangulation technique on the difference to determine surface roughness of the road to be travelled by the vehicle.

9. The system as recited in claim 7 wherein the measurement device is a laser.

10. The system as recited in claim 6 wherein the measurement device measures the vertical elevation of the road and is further operative to receive an image of the portion of the road, the image having varying characteristics based on the roughness of the road.

11. The system as recited in claim 10 wherein the varying characteristics include varying shades of color.

12. The system as recited in claim 10 wherein the measurement device is a machine vision system.

* * * * *